United States Patent Office 3,152,768
Patented Oct. 13, 1964

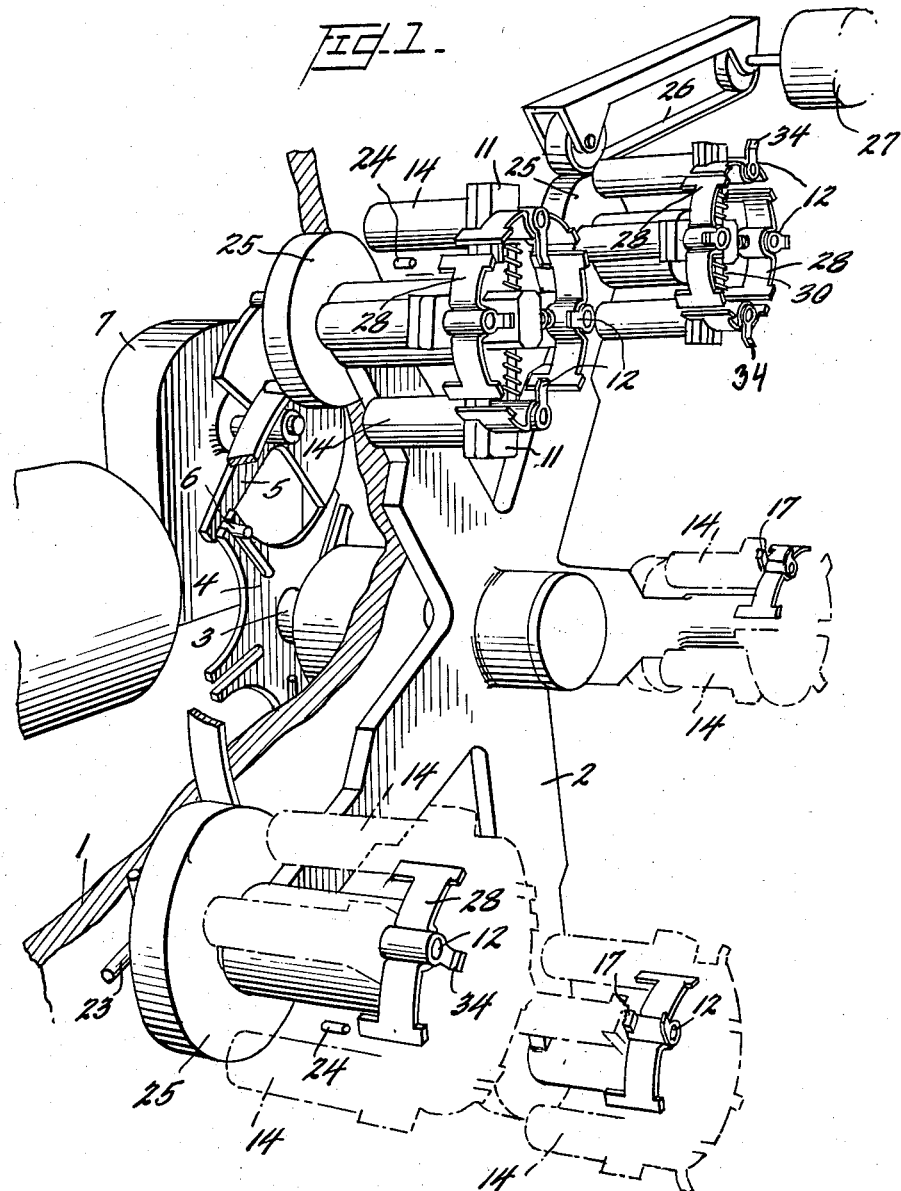

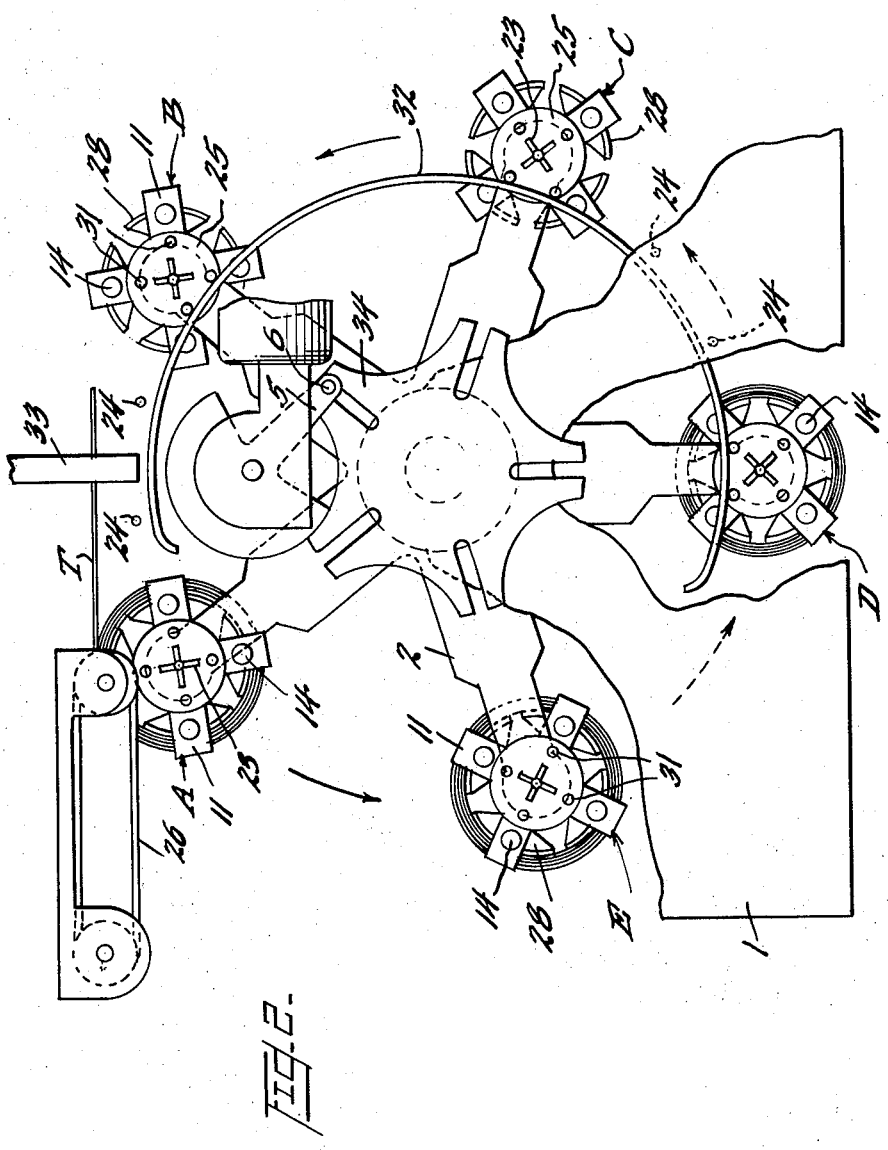

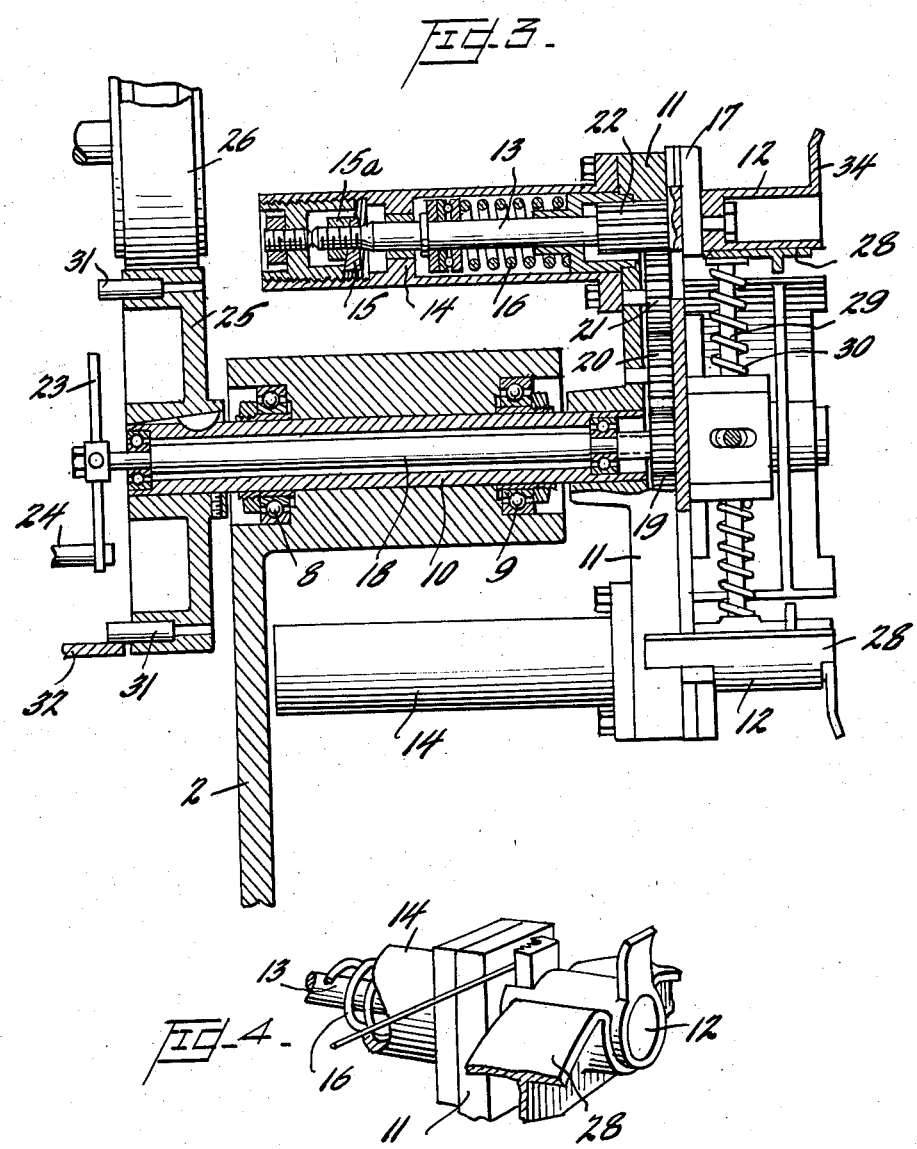

3,152,768
APPARATUS FOR WINDING UP INTO COILS WIRE OR CABLE
Olof Holger Åström, Barrstigen 28, Bromma, Sweden
Filed Dec. 12, 1961, Ser. No. 158,765
Claims priority, application Sweden Jan. 19, 1961
5 Claims. (Cl. 242—25)

The present invention generally relates to apparatus for winding up wire or cable coming from a cable covering machine or the like, and more particularly concerns such apparatus adapted to be associated with a plastic extruder in which an electrical cable has an insulating covering applied to it. The cable discharged from such a plastic extruder is to be wound up into coils, and each such coil is to contain a predetermined length of cable, such as 100 metres, for example. Prior wind-up devices for this purpose have the disadvantage that, after winding up a coil, the operator has to stop the machine in order to cut off the cable and affix it to a new reel for winding up the next coil. This is a relatively time-consuming procedure, which makes the capacity of the plastic extruder far from being utilizable, at the same time necessitating the employment of a special attendant for each machine.

The present invention has for its object to provide a device in which said winding-up into coils of a predetermined length is effected entirely automatically, i.e. in which, after completing one coil, the cable is transferred to a new wind-up reel and is then severed without any need of interrupting the advancement of the cable.

According to the invention, the apparatus for carrying out this wind-up operation comprises two or more wind-up reels which are mounted to be freely rotatable on a carrier rotatably mounted on a frame structure and suitably adapted to be indexed relative thereto, each such reel being provided with at least one combined severing and clamping device adapted to retain the cable during coiling, the arrangement being such that, after the predetermined length of cable is wound up on one reel, the latter is advanced by one step by the carrier and, at the same time, the next succeeding reel is indexed to the operating position, the severing and clamping device of the last-mentioned reel then being actuated to clamp the cable and to sever the same at a location between this reel and the next preceding reel already charged with a complete coil.

These and further features of the invention will be described more closely hereinafter in conjunction with the accompanying drawings illustrating an embodiment thereof, and in which:

FIG. 1 is a diagrammatic front-perspective elevational view of the coiling apparatus, whereas
FIG. 2 is a rear-view elevation thereof;
FIG. 3 illustrates a wind-up reel, partly in axial, longitudinal section; and
FIG. 4 is a perspective view of a detail.

Referring to the drawings more specifically, numeral 1 designates a stand or frame having rotatably mounted therein a spider 2, the latter, in the embodiment illustrated, being provided with five arms, each arm carrying at its extreme end a wind-up reel for receiving the cable to be coiled, this cable coming from a machine, not shown, for covering electrical wire with plastic insulation. The shaft 3 journally mounting the spider 2 also carries a Maltese cross 4 adapted through a lever 5 and pin 6 associated therewith to index a motor 7 at times as specified in detail hereinafter. Actually, the Maltese-cross drive may have its actuating impulse applied to it from a monitoring device or control which measures the length of cable coiled onto the reel concerned.

Each wind-up reel comprises a tubular shaft 10 rotatably mounted in the respective spider arm by means of ball bearings 8 and 9 and carrying at its end remote from the Maltese cross 4 a multi-armed casing 11 carrying near its outer peripheral edge four circumferentially equally spaced studs 12 onto which the cable is intended to be wound in the form of a coil. Each stud 12 is rotatably mounted by means of a spindle 13 in a sleeve 14 projecting from the face of the casing 11 remote from the stud. This spindle 13, and thus the stud, is adapted in addition to be displaceable to a slight degree in the axial direction by means of an element 15a on the spindle cooperating with a cam disc 15, the spindle being urged in a rearward sense by a spring 16, the latter being adapted at the same time to serve as an actuating spring for a combined severing and clamping member 17 of a design which will appear more clearly from FIG. 4. Rotatably mounted within the tubular shaft 10 is a second shaft 18 provided at its end projecting into the casing 11 with a toothed gear 19 which, through two idling gears 20 and 21, cooperates with gears 22 secured to or integral with respective ones of the spindles 13, and in such a manner as to cause rotation of the spindles 13, and thus of the studs 12, upon rotation of the second shaft 18. This rotation of shaft 18 is effected by means of a spider 23 secured to its extreme end and cooperating with a plurality of pins 24 fixedly mounted in the frame structure, as will be described more closely hereinafter in conjunction with the description of the operation of the apparatus. Mounted on the end of the tubular shaft 10 adjacent to the spider 23 is a friction drum 25 adapted, in one indexed position of the spider 2, to engage an endless belt 26 driven by an electric motor 27 through a belt pulley. The stud 12 is slightly eccentrically offset relative to the axis of spindle 13 in a manner to cause the stud, after turning the spindle through 180°, to move radially outwards by a slight amount, whereby to facilitate withdrawal of the completed coil from the wind-up reel. In order to increase the supporting surface area onto which the cable is coiled up, there is provided at each stud a supporting plate 28 fastened to a pin 29 in such a way as to be allowed to move radially inwards to the same extent as the stud 12 against the action of a spring 30. As will appear most clearly from FIG. 2, each friction drum 25 is provided with four axially extending pins 31 adapted during a certain portion of the path of movement of the wind-up reels to cooperate with a guide rail 32 in a manner to cause the reels to be locked against rotation about their own axes during said portion of their path of movement.

The operation of the apparatus is as follows:

Starting from the position shown in FIG. 2, in which one wind-up reel A is in its operative position for coiling up the cable T, i.e. in which the friction drum of this reel is in engagement with the driving belt 26, the latter acts to rotate the reel at a speed corresponding to the speed of production of the cable. To obtain guidance of the cable laterally, a reciprocating wire guide 33 is provided. As the proper length of cable has been coiled onto the reel A actually operating, the spider 2, by the action of the Maltese-cross drive mechanisms 4 through 6, will be indexed by one step, whereby the reel A thus completely charged will be removed from its engagement with the driving belt 26, and at the same time the next-succeeding reel B, as seen in the sense of revolution, will be advanced to its position of engagement with the driving belt 26. In the course of this movement of reel B, spider 23 will engage pin 24 thereby rotating shaft 18 through 180°. This will also cause rotation of the spindles 13, and thus of the studs 12, by the same amount through the intermediary of the gearing 20, 21 and 22, thereby rotating the stud 12 in a manner, on one hand, to cause a flange portion or lug 34 formed integrally therewith to project radially outwards so as to form an outer lateral abutment for the coil to be wound up, and, on the other hand, during the initial portion of the movement to cause the stud, under the action of the cam disc 15 to be displaced axially outwards, whereby the combined severing and clamping member 17 is moved slightly away from the portion of the casing 11 serving as an abutment shoulder therefor. At the same time, the wire guide 33 will move the cable T into engagement with the casing 11, whereby, on rotation of the respective stud 12, the cable will enter the gap between the casing and the associated severing and clamping member 17. During the final phase of the angular movement of the stud 12, the stud 12 and thus the member 17 will be allowed by cam disc 15 to be returned by snap-action to its initial position, thereby, on one hand, causing the cable T to be severed between reels A and B, and, on the other hand, to cause the leading end of the cable arriving from the machine to be clamped to reel B, whose friction drum will substantially simultaneously therewith engage the driving belt 26, whereby the coiling-up of the cable will continue onto this new reel B without the advancement of the cable having been interrupted. While the coiling of the cable onto the reel B is going on, reel A is decelerated in any suitable manner whereby this reel will be stationary at the time of initiating the next-succeeding indexing movement of spider 2. In the course of this new indexing movement, the cable will be transferred to reel C in the same manner as already described, the reel A at the same time arriving into engagement with the guide rail 32 where the reel is secured against angular displacement by the cooperation of the pins 31 with said guide rail, as will be seen from FIG. 2. During the next-succeeding indexing movement, the spider 23 of reel A will engage the lower pins 24, thereby again turning the studs 12 through 180°, which, on one hand, will cause the lugs or flange portions 34 of the studs to be directed radially outwards and, on the other hand, will cause the studs, due to the action of their respective cam discs 15, to be displaced axially outwards, whereby the severing and clamping members 17 will move away from the casing 11, thereby releasing the cable from the reel enabling the coil to be removed from the reel by the use of any suitable stripping tool. Such stripping of the coil is facilitated by the fact that, simultaneously with the 180° rotation of the studs, the latter, due to their eccentricity above referred to, will be slightly displaced radially inwards. After indexing the reel stand by one further step, the reel A is in position for the initiation of a new cycle of operation.

The invention, obviously, is not restricted to the embodiment herein described, but may be varied in several different ways without departing from its scope. Thus, for instance, the wind-up apparatus, to advantage, may be employed also for coiling conventional wire or yarn arriving from wire or yarn manufacturing machines of various kinds.

I claim:
1. Apparatus for winding up wire or cable into coils, particularly as issuing from a cable-covering machine, comprising a frame structure, a carrier rotatably mounted in the frame structure, at least two wind-up reels mounted to be freely rotatable on the carrier which latter is rotatable stepwise on the frame structure, each of said reels comprising a tubular shaft, a multi-armed casing secured to the tubular shaft rotatably mounted in the carrier, said casing being provided with a plurality of circumferentially equally spaced and axially projecting studs and each stud being equipped with a combined severing and clamping device, a cam member provided on the carrier, said studs being mounted to be displaceable axially with each stud cooperating with the cam member so that, during a portion of its angular displacement, the stud together with its associated severing and clamping device will be moved away from the casing, thereby to enable the cable, in order to be clamped and severed, to be introduced into the gap thus formed between said device and the casing, and to be released from the reel respectively, and a spring, said cam member allowing the stud and its associated severing and clamping device under the action of the spring, to return in a snap-like manner to its initial position immediately before the winding starts.

2. Apparatus according to claim 1, in which the studs are rotatably mounted in the multi-armed casing and in which a gearing mechanism is provided to angularly displace the studs, the mechanism being disposed within the casing and having its movement imparted thereto by a shaft extending axially through the tubular shaft, and in which a spider is provided on the shaft at its end projecting from the friction drum in order to impart rotation to said shaft at the desired instant and to the desired extent, to cooperate with pins mounted in the frame structure.

3. Apparatus according to claim 1, in which the studs are rotatably mounted in the multi-armed casing and in which a gearing mechanism is provided to angularly displace the studs, the mechanism being disposed within the casing and having its movement imparted thereto by a shaft extending axially through the tubular shaft, and in which a spider is provided on the shaft at its end projecting from the friction drum in order to impart rotation to said shaft at the desired instant and to the desired extent, to cooperate with pins mounted in the frame structure, and the studs being eccentrically mounted to cause the same, upon rotation thereof, to be slightly displaced radially to facilitate removal of the coil from the reel.

4. Apparatus according to claim 1, in which a radially projecting flange-like lug is provided with each stud having at its free end the radially projecting flange-like lug to serve as an outer lateral abutment for the cable being coiled onto the reel.

5. Apparatus according to claim 1, in which an endless driving belt is provided and a friction drum is provided for each reel adapted in the operative position of the reel to engage the endless driving belt, and in which at least two axially projecting abutments and a guide rail are provided with the projecting abutments being adapted to cooperate with the guide rail rigidly connected to the frame structure to thereby, for the major portion of the inoperative path of the stepwise movement of the carrier, secure the reels against rotation about their shaft of rotation.

References Cited in the file of this patent
UNITED STATES PATENTS

| | | |
|---|---|---|
| 601,495 | Cornell et al. | Mar. 29, 1898 |
| 1,988,437 | Brillhart | Jan. 22, 1935 |
| 2,321,646 | Blodgett | June 15, 1943 |
| 2,779,545 | Hauck et al. | Jan. 29, 1957 |